United States Patent
Zhang et al.

(10) Patent No.: US 9,533,518 B2
(45) Date of Patent: Jan. 3, 2017

(54) PAPER INPUT MECHANISM HAVING BUFFER FUNCTION AND PRINTING DEVICE USING THE MECHANISM

(71) Applicant: SHANDONG NEW BEIYANG INFORMATION TECHNOLOGY CO., LTD, Weihai (CN)

(72) Inventors: Zhengmin Zhang, Weihai (CN); Tianxin Jiang, Weihai (CN); Shanhua Xu, Weihai (CN); Jigang Zhang, Weihai (CN); Shuxun Dong, Weihai (CN)

(73) Assignee: SHANDONG NEW BEIYANG INFORMATION TECHNOLOGY CO., LTD, Weihai (CN)

( * ) Notice: Subject to any disclaimer, the term of this patent is extended or adjusted under 35 U.S.C. 154(b) by 0 days.

(21) Appl. No.: 14/780,100

(22) PCT Filed: Mar. 20, 2014

(86) PCT No.: PCT/CN2014/073790
§ 371 (c)(1),
(2) Date: Sep. 25, 2015

(87) PCT Pub. No.: WO2014/154112
PCT Pub. Date: Oct. 2, 2014

(65) Prior Publication Data
US 2016/0039229 A1 Feb. 11, 2016

(30) Foreign Application Priority Data
Mar. 26, 2013 (CN) .......................... 2013 1 0099986

(51) Int. Cl.
*B41J 15/04* (2006.01)
*B65H 23/04* (2006.01)
(Continued)

(52) U.S. Cl.
CPC ........... *B41J 15/042* (2013.01); *B41J 11/0045* (2013.01); *B41J 15/005* (2013.01);
(Continued)

(58) Field of Classification Search
CPC ..... B41J 11/0045; B41J 15/042; B41J 15/005; B65H 16/10; B65H 20/02; B65H 23/048; H04N 1/00
(Continued)

(56) References Cited

U.S. PATENT DOCUMENTS

| 2005/0184119 A1 | 8/2005 | Ohmura et al. |
| 2008/0173750 A1* | 7/2008 | Takeuchi ............... B41J 15/042 242/564.1 |

(Continued)

FOREIGN PATENT DOCUMENTS

| CN | 201240713 Y | 5/2009 |
| CN | 202029519 U | 11/2011 |

(Continued)

OTHER PUBLICATIONS

International Search Report for counterpart PCT Application No. PCT/CN2014/073790, dated Jun. 23, 2014 (8 pgs.).

*Primary Examiner* — Stephen Meier
*Assistant Examiner* — Alexander D Shenderov
(74) *Attorney, Agent, or Firm* — Shumaker & Sieffert, P.A.

(57) ABSTRACT

A paper input mechanism having a buffer function and a printing device using the mechanism are disclosed. The paper input mechanism (300) includes a frame (1) forming a conveying passage (P) for conveying continuous paper, and further includes a fixed passage plate (4) and a buffer plate (2) both located at a paper inputting side of the conveying passage (P), wherein the buffer plate (2) has an initial position and is pressed by the continuous paper to (Continued)

deviate from the initial position; the buffer plate (2) is opposite to the fixed passage plate (4) when being located at the initial position, so as to form a paper input passage (R), and the paper input passage (R) is connected with the conveying passage (P). Arrangement of the buffer plate (2) not only implements the buffer function, but also results in close fit between the buffer plate (2) and the frame (1) of the paper input mechanism (300) to create a unique paper inputting port, thereby effectively avoiding the problem that continuous paper is incorrectly installed by a user, and improving the usability of the product.

13 Claims, 10 Drawing Sheets

(51) Int. Cl.
*B65H 20/02* (2006.01)
*B41J 11/00* (2006.01)
*B65H 16/10* (2006.01)
*B41J 15/00* (2006.01)
*H04N 1/00* (2006.01)

(52) U.S. Cl.
CPC ............. *B65H 16/10* (2013.01); *B65H 20/02* (2013.01); *B65H 23/048* (2013.01); *H04N 1/00* (2013.01)

(58) Field of Classification Search
USPC .................................................. 347/104, 110
See application file for complete search history.

(56) References Cited

U.S. PATENT DOCUMENTS

2010/0054837 A1   3/2010   Sakai
2011/0110699 A1*  5/2011   Tang ........................ B41J 29/02
                                                      400/663

FOREIGN PATENT DOCUMENTS

CN        102975495 A     3/2013
JP        2002128347 A    5/2002
JP          3644823 B2    5/2005

\* cited by examiner

PAPER INPUT MECHANISM HAVING BUFFER FUNCTION AND PRINTING DEVICE USING THE MECHANISM

The present application is a national stage entry under 35 U.S.C. §371 of PCT Application No. PCT/CN2014/073790 filed on Mar. 20, 2014 in the name of Shandong New Beiyang Information Technology Co., LTD., which claims priority to Chinese invention application numbered 201310099986.8 and entitled "Paper input mechanism having buffer function and printing device using the mechanism" submitted to the State Intellectual Property Office of the People's Republic of China on Mar. 26, 2013. The entire contents of PCT/CN2014/073790 and Chinese Invention Patent Application No. 201310099986.8 are incorporated herein by reference.

TECHNICAL FIELD OF THE INVENTION

The present invention relates to a paper input mechanism having a buffer function and a printing device using the mechanism.

BACKGROUND OF THE INVENTION

At present, self-service terminal devices having an embedded printing device have been widely applied in everyday life. For example, people inquire and print a bill list through a self-service terminal device in a Telecom business office, and deposit and withdraw money, and print a transaction voucher through a self-service terminal device in a self-service kiosk of a bank. Generally, a self-service terminal device uses continuous paper to print a voucher. The continuous paper is wound on a paper tube to form a paper roll. The continuous paper is cut off by a cutting device each time when printing is finished, so as to form a single voucher which is delivered to a user. When the paper roll is used up, the self-service terminal device sends out prompt information to prompt a service staff member to replace the paper roll. Usually, a paper roll having a large external diameter, such as a paper roll having an external diameter of 200 mm to 250 mm, is used in order to reduce a frequency of changing paper rolls and reduce labor cost. When printing begins, the load of a motor dragging the static paper roll which is relatively heavy with a relatively large external diameter to move is maximized under the effect of inertia, thus easily resulting in a problem that printing content is compressed due to the incapability of the motor to drag the paper roll.

Figure 1:
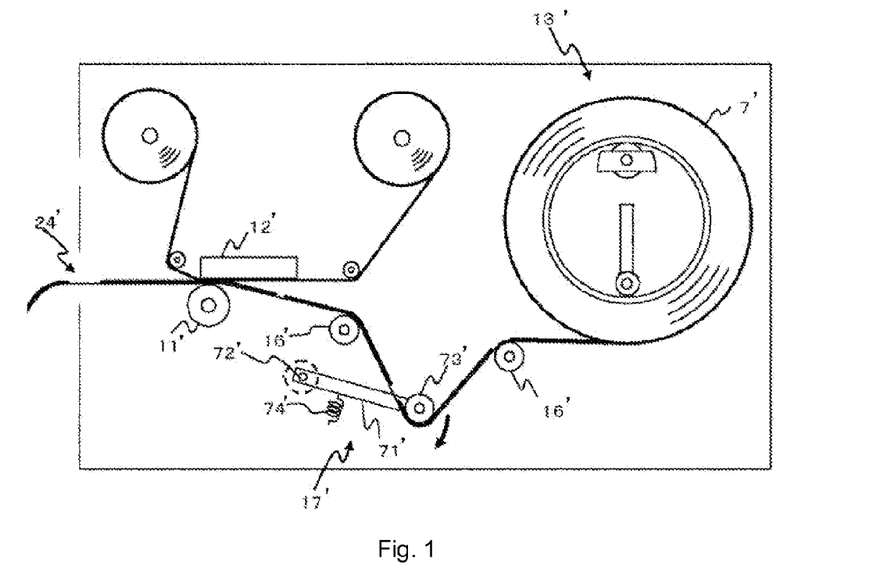
FIG. 1 is a structural view of a buffer mechanism provided in the prior art.

A buffer mechanism is arranged between the paper roll and a printing device in the prior art in order to solve the foregoing problem. As shown in FIG. 1, the buffer mechanism 17' is arranged between a paper roll supporting frame 13' and the printing device. The buffer mechanism 17' includes a swing arm 71', a buffer shaft 73' and an elastic element 74' and two transition rollers 16', wherein one end of the swing arm 71' is pivoted with a frame (not shown in the figure) through a pivoting shaft 72' and is capable of swinging around the pivoting shaft 72'. The buffering shaft 73' is arranged on a free end of the swing arm 71'. One end of the elastic element 74' is connected with the frame and another end is connected with the swing arm 71'. The two transition rollers 16' are located upstream and downstream the buffer shaft 73' respectively along a conveying direction of continuous paper. The continuous paper 24' is draw from by a paper roll 7' to pass through a location below the buffer shaft 73' after passing through a location above the transition roller 16' upstream the buffer shaft 73', and then enter into a location between a printing head 12' and a platen 11' after passing through a location above the transition roller 16' downstream the buffer shaft 73'. At the moment, the swing arm 71' rotates around the pivoting shaft 72' under the action of the elastic element 74 and the continuous paper 24' is always tensioned by the buffer shaft 73' located on the swing arm 71'. In this way, the buffer shaft 73' can provide buffer to reduce the load of a motor when the motor is started and accelerated after printing begins, thus avoiding the problem that printing content is compressed.

Such buffer mechanism has a problem that a user may place the continuous paper between the printing head 12' and the platen 11' directly by mistake without passing through the buffer shaft 73' when loading the paper, thus the load of the motor cannot be reduced, and the printing content cannot be prevented from being compressed.

SUMMARY OF THE INVENTION

A purpose of the present invention is to provide a paper input mechanism having a buffer function. The paper input mechanism is simple in structure and capable of reliably avoiding incorrect paper loading. A further purpose of the present invention is to provide a printing device using the paper input mechanism.

For these purposes, a paper input mechanism having a buffer function is provided according to an aspect of the present invention, comprising: a frame forming a conveying passage for conveying continuous paper, and further comprising a fixed passage plate and a buffer plate both located at a paper inputting side of the conveying passage, wherein the buffer plate has an initial position and is pressed by the continuous paper to deviate from the initial position; the buffer plate is opposite to the fixed passage plate when being located at the initial position, so as to form a paper input passage, and the paper input passage is connected with the conveying passage.

Further, the frame comprises a first passage member and a second passage member to form the conveying passage, wherein the fixed passage plate is integrated with the first passage member.

Further, the frame comprises a first passage member and a second passage member to form the conveying passage, wherein the buffer plate is matched with the second passage member in a plugging manner.

Further, the first passage member comprises a first passage plate and sidewall plates arranged at two sides of the first passage plate along a width direction of the conveying passage; the second passage member comprises a second passage plate and wall plates arranged at two sides of the second passage plate along the width direction of the conveying passage, wherein a clamping mechanism is provided between the sidewall plates and the wall plates, and there is a preset distance between the first passage plate and the second passage plate to form the conveying passage.

Further, the clamping mechanism comprises an elastic clamping hook and a clamping slot, wherein, the elastic clamping hook is arranged on one of the sidewall plates and the wall plates, and a clamping slot is arranged on the other one of the sidewall plates and the wall plates and matched with the elastic clamping hook in a clamping manner.

Further, the clamping mechanism further comprises a slot arranged on either the sidewall plates or the wall plates and a locating block arranged on the other of the sidewall plates and the wall plates and matched with the slot in a plugging manner.

Further, a section of the conveying passage along a conveying direction of the continuous paper is in an L shape, or a section of a combination of the conveying passage and the paper input passage along the conveying direction of the continuous paper is in an L shape.

Further, the buffer plate is movably connected with the frame; the frame thereon is further provided with an elastic resetting element enabling the butter plate to reset to the initial position.

Further, two sides of the buffer plate along a width direction of the continuous paper are symmetrically provided with a first guide pillar and a second guide pillar; the frame is provided with a first guide slot matched with the first guide pillar and a second guide slot matched with the second guide pillar; during a process in which the buffer plate deviates from the initial position, the first guide pillar slides from a start end of the first guide slot to a stop end of the first guide slot and the second guide pillar slides from a start end of the second guide slot to a stop end of the second guide slot.

Further, a length direction of the first guide slot is arranged with an included angle with a length direction of the second guide slot.

Further, a length direction of the second guide slot is parallel with the fixed passage plate; the first guide slot is located upstream the second guide slot along a conveying direction of the continuous paper.

Further, the buffer plate is pivoted with the frame through a pivoting shaft; the buffer plate is pressed by the continuous paper to rotate around the pivoting shaft so as to deviate from the initial position.

Further, the buffer plate is arranged on the frame in a rectilinear translation-capable manner, and the frame is provided with a first guide slot guiding the buffer plate to perform rectilinear translation.

Further, the continuous paper is provided by a paper roll; a beginning section of the conveying passage and the paper input passage extend tangentially along an excircle of the paper roll, and preferably extend in a height direction of the frame at the same time.

A printing device is provided according to another aspect of the present invention, comprising a paper roll supporting mechanism and a printing mechanism, wherein the printing device further comprises the aforementioned paper input mechanism having a buffer function and arranged between the paper roll supporting mechanism and the printing mechanism, wherein a conveying passage of the paper input mechanism communicates with a paper inlet of the printing mechanism.

In a paper input mechanism having a buffer function according to the present invention, a conveying passage P is arranged on a frame; a buffer plate and a fixed passage plate are located upstream the conveying passage P along a conveying direction of continuous paper; the buffer plate has an initial position and is capable of being pressed by the continuous paper to deviate from the initial position, wherein the buffer plate is opposite to the fixed passage plate when being located at the initial position, so as to form an inlet passage connected with the conveying passage; the inlet passage is provided with a unique paper inlet. Therefore, an operator can only load the continuous paper into the conveying passage P from the paper inlet when installing the continuous paper. When the continuous paper is static, the buffer plate is located at the initial position under the action of an elastic resetting element. When being pulled to move, the continuous paper presses the buffer plate to deviate from the initial position. In the meanwhile, the buffer plate can maintain the continuous paper in a tensioned state under the action of the elastic resetting element.

Compared with the prior art, a paper input mechanism having a buffer function according to the present invention provides a buffer plate to not only implement a buffer function, but also result in a close fit with a frame of the paper input mechanism to form a unique paper inlet, thereby effectively avoiding the problem that continuous paper is incorrectly installed by a user, and improving the usability of the product.

Besides the aforementioned purposes, characteristics and advantages, the present invention has other purposes, characteristics and advantages, which will be further expounded in combination with the accompanying drawings.

BRIEF DESCRIPTION OF THE DRAWINGS

The accompanying drawings, which constitute a part of the specification and are used for further understanding the present invention, show preferred embodiments of the present invention and are used for describing the principles of the present invention with the specification. In the drawings.

NUMERALS IN THE ACCOMPANYING DRAWINGS

1. Frame
2. Buffer plate
3. Elastic resetting element
4. Fixed passage plate
11. First passage plate
12. Second passage plate
13. Left sidewall plate
14. Right sidewall plate
21. First guide pillar
22. Second guide pillar
23. Insertion plate
24. Contact part
26. Pivoting shaft
P. Conveying passage
51. Elastic clamping hook
52. Locating block
61. Clamping slot
62. Slot
81. First guide slot
82. Second guide slot
100. Printing mechanism
200. Paper roll supporting mechanism
300. Paper input mechanism
111. Printing head
112. Platen
121. Left wall plate
122. Right wall plate
123. Slot
124. Pivoting hole
125. Arc-shaped flanging.

DETAILED DESCRIPTION OF THE EMBODIMENTS

Embodiments of the present invention will be expounded below in combination with the accompanying drawings. However, the present invention may be implemented by many different methods limited and covered by the claims.

Figure 2:
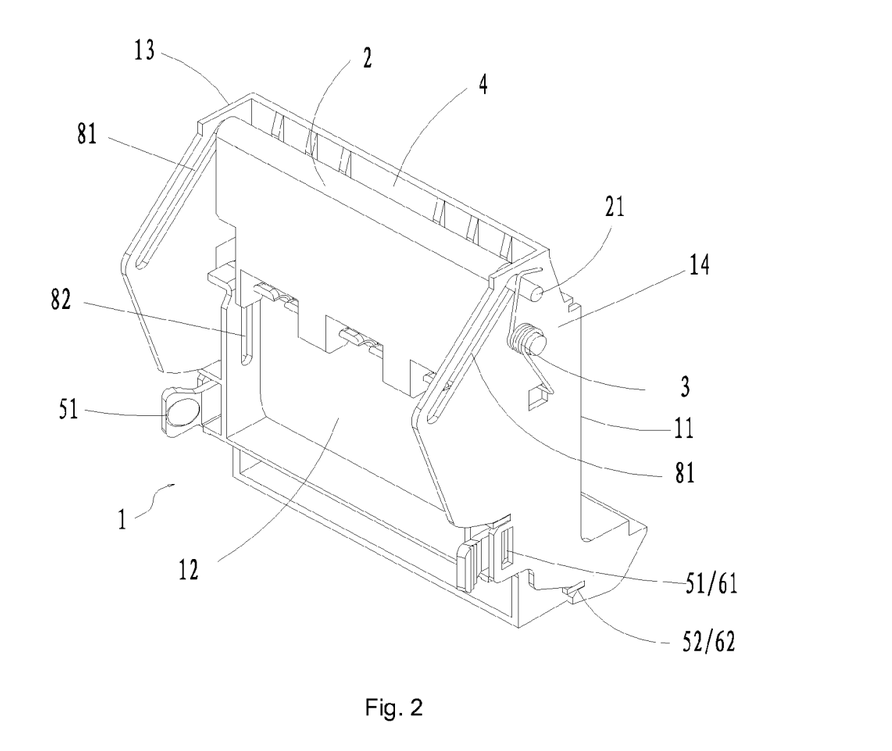
FIG. 2 is a structural view of a paper input mechanism having a buffer function according to a first embodiment of the present invention.
Figure 3A:
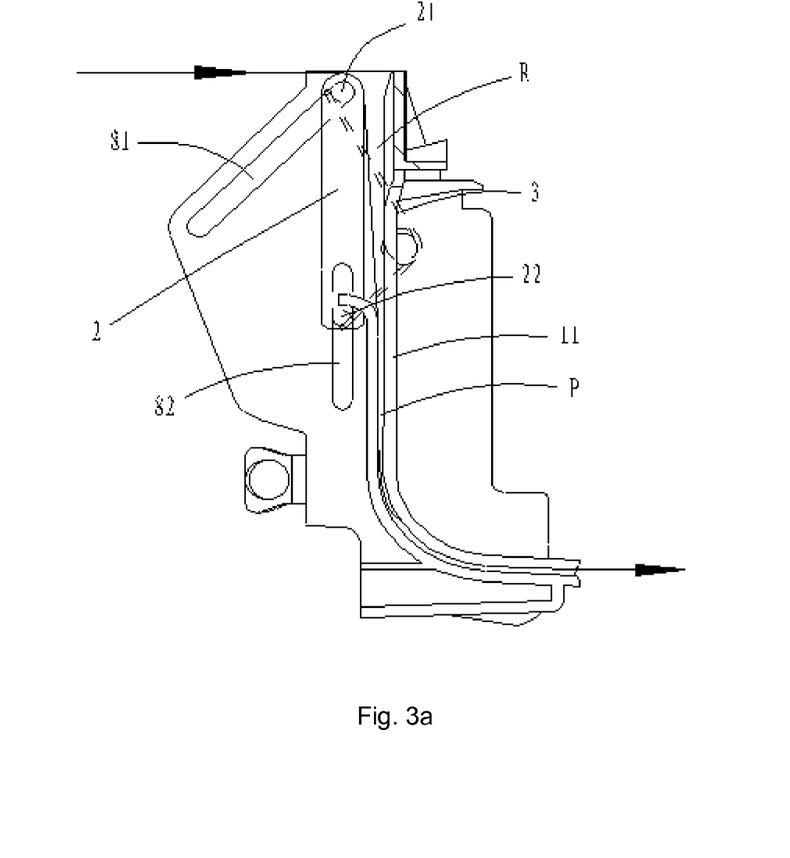
FIG. 3a is a structural section view of the paper input mechanism having a buffer function according to the first embodiment of the present invention, wherein a buffer plate is located at an initial position.
Figure 3B:
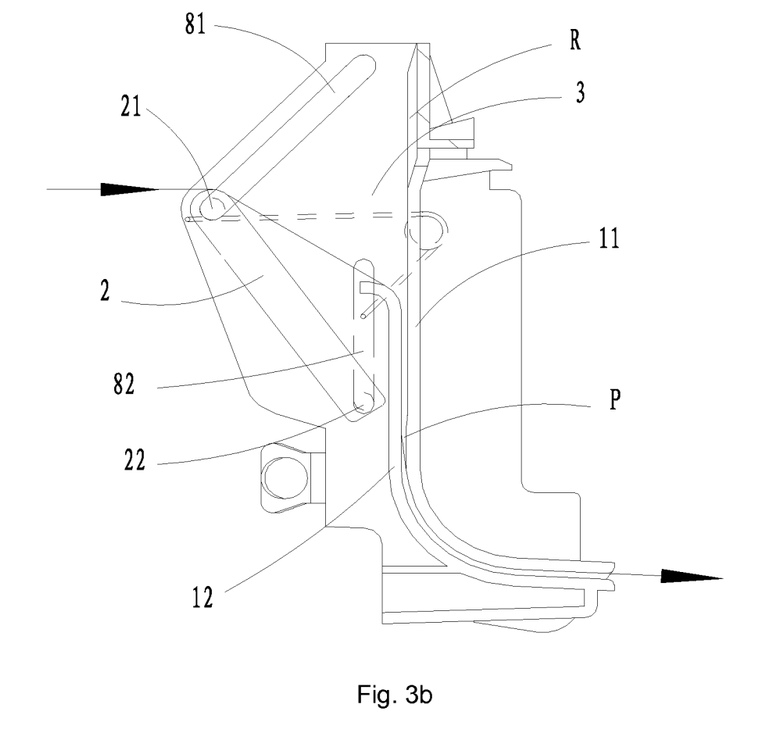
FIG. 3b is a structural section view of the paper input mechanism having a buffer function according to the first embodiment of the present invention, wherein the buffer plate deviates from the initial position.

As shown in FIG. 2, FIG. 3a and FIG. 3b, a paper input mechanism having a buffer function according to the present invention includes a frame 1, a buffer plate 2, at least one elastic resetting element 3, and a fixed passage plate 4, wherein the frame 1 is provided with a conveying passage P. A paper outlet of the conveying passage P communicates with a paper inlet of a printing mechanism. The buffer plate 2 and the fixed passage plate 4 are located upstream the conveying passage P along a conveying direction of continuous paper. The buffer plate 2 is movably connected with the frame 1 and has an initial position and a final location, wherein the buffer plate 2 is opposite to the fixed passage plate 4 when being located at the initial position, so as to form a paper input passage R connected with the conveying passage P. The paper input passage R is provided with a unique paper inlet and an operator can only load the continuous paper into the conveying passage P from the paper inlet when loading the continuous paper.

One end of the elastic resetting element 3 is connected to the frame 1 and another end is connected to the buffer plate 2. The buffer plate 2 always has a tendency to move towards the initial position under the action of an elastic force of the elastic resetting element 3.

When the continuous paper is static, the buffer plate 2 is located at the initial position. When being pulled to move, the continuous paper presses the buffer plate 2 to deviate from the initial position, and moves from the initial position to the final location. In the meanwhile, the buffer plate 2 can maintain the continuous paper in a tensioned state under an action of the elastic resetting element 3.

Figure 4A:
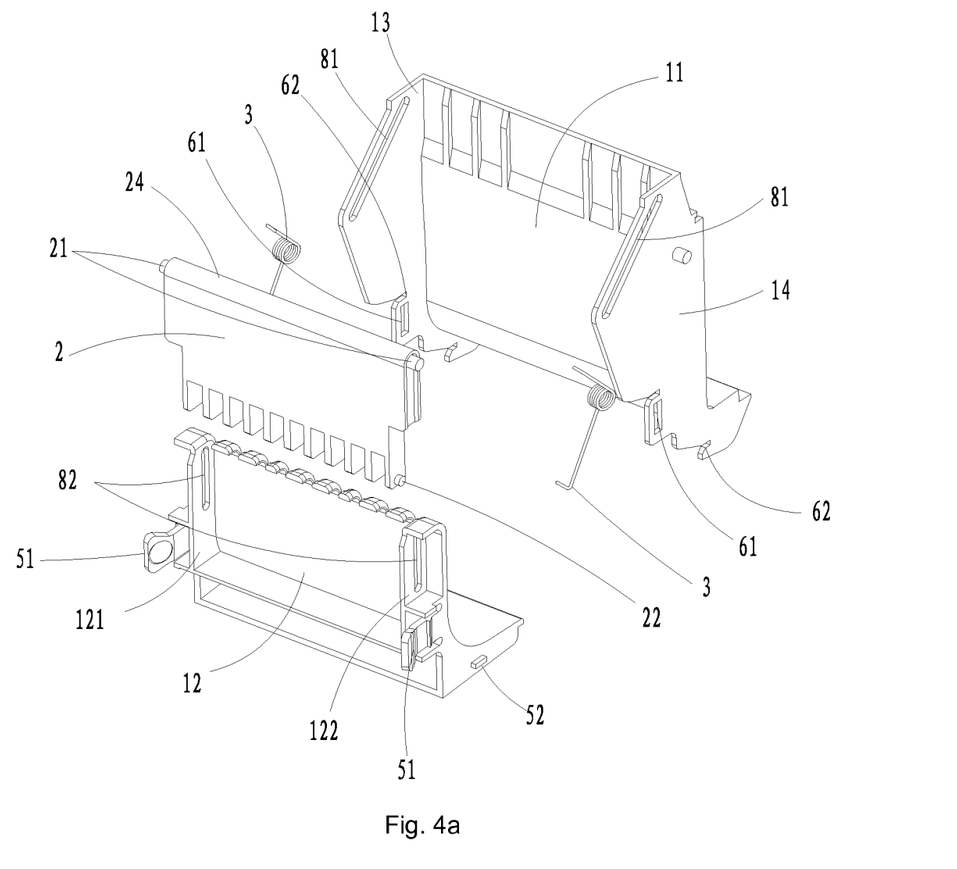
FIG. 4a is the first exploded view of the paper input mechanism having a buffer function according to the first embodiment of the present invention.
Figure 4B:
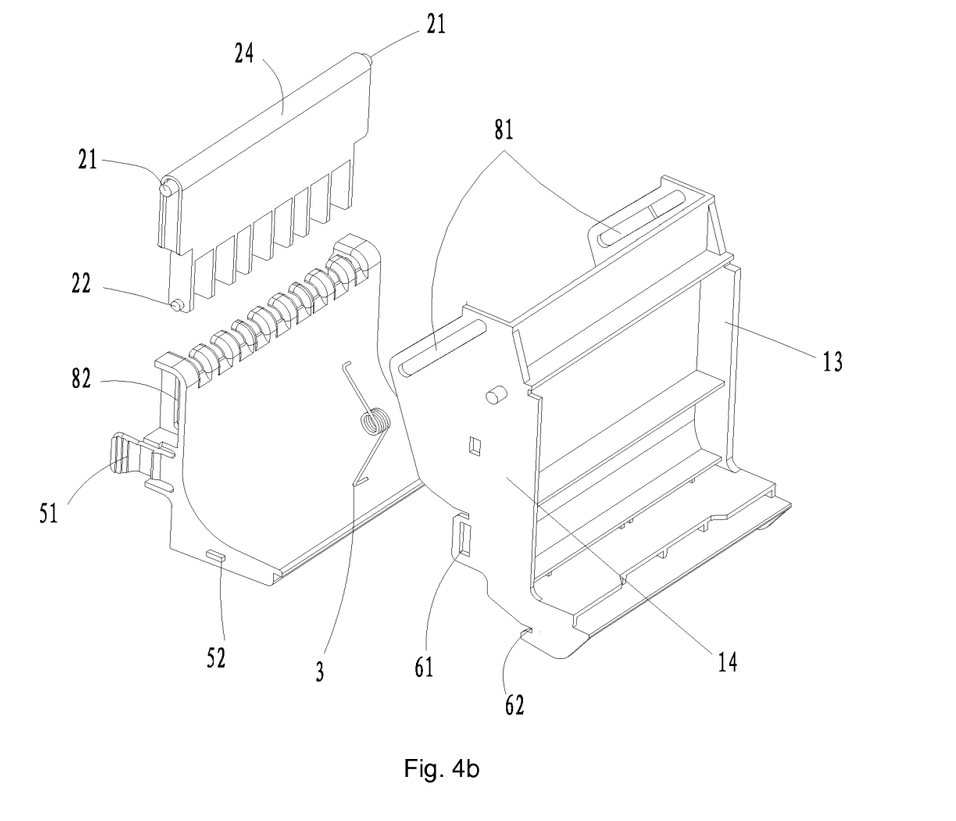
FIG. 4b is the second exploded view of the paper input mechanism having a buffer function according to the first embodiment of the present invention.

FIG. 4a is the first schematic view illustrating structural decomposition of the paper input mechanism having a buffer function according to the first embodiment of the present invention and FIG. 4b is the second schematic view illustrating structural decomposition of the paper input mechanism having a buffer function according to the first embodiment of the present invention. As shown in FIG. 4a and FIG. 4b, the frame 1 includes a first passage member and a second passage member to combined with each other so as to form the conveying passage P, wherein the first passage member includes a first passage plate 11 and sidewall plates arranged at two sides of the first passage plate 11 along a width direction of the conveying passage, i.e. a left sidewall plate 13 and a right sidewall plate 14, wherein the left sidewall plate 13 and the right sidewall plate 14 are arranged oppositely in parallel and a distance between the two is longer than the maximum width of the continuous paper. The first passage plate 11 is located between the left sidewall plate 13 and the right sidewall plate 14 and is connected vertically to both the left sidewall plate 13 and the right sidewall plate 14.

The second passage member includes a second passage plate 12. The second passage plate 12 faces the first passage plate 11 at a preset distance to form the conveying passage P, wherein a distance between the first passage plate 11 and the second passage plate 12 is the height of the conveying passage P and a distance between the left sidewall plate 13 and the right sidewall plate 14 is the width of the conveying passage P.

Both the first passage plate 11 and the second passage plate 12 in the present embodiment are in an L shape. The fixed passage plate 4 is located upstream the first passage plate 11 along the conveying direction of the continuous paper. The first passage plate 11, the left sidewall plate 13, the right sidewall plate 14 and the fixed passage plate 4 are integrated. The second passage plate 12 is located between the left sidewall plate 13 and the right sidewall plate 14. Wall plates are arranged at two sides of the second passage plate 12 along the width direction of the conveying passage, i.e. a left wall plate 121 arranged at an end close to the left sidewall plate 13 and a right wall plate 122 arranged at an end close to the right sidewall plate 14. The second passage plate 12 is detachably connected with the left sidewall plate 13 and the right sidewall plate 14 through a clamping mechanism. The clamping mechanism includes two clamping assemblies. The two clamping assemblies are arranged on the left wall plate 121 of the second passage plate 12 and the left sidewall plate 13, and between the right wall plate 122 of the second passage plate 12 and the right sidewall plate 14 symmetrically.

In the present embodiment, the fixed passage plate 14 and the first passage member are integrated, e.g. they are integrated into a plastic formed part.

A specific embodiment of a clamping assembly will be introduced below by taking the clamping assembly between the second passage plate 12 and the right sidewall plate 14 as an example. The clamping assembly includes an elastic clamping hook 51, a locating block 52, a clamping slot 61 and a slot 62, wherein the locating block 52 is arranged on either the second passage plate 12 or the right sidewall plate 14 and is provided with a set width and a set height. The slot 62 is arranged on the other one of the second passage plate 12 and the right sidewall plate 14, and an opening direction of the slot 62 is vertical to a surface of the first passage plate 11. Therefore, the second passage plate 12 may be moved along a direction vertical to the surface of the first passage plate 11 to match the locating block 52 and the slot 62 in a plugging manner. The elastic clamping hook 51 is provided on either the second passage plate 12 or the right sidewall plate 14. The clamping slot 61 is arranged on the other one of the second passage plate 12 and the right sidewall plate 14. When the locating block 52 is matched with the slot 62 in a plugging manner, the elastic clamping hook 51 is matched with the clamping slot 61 in a clamping manner so that the second passage plate 12 is fixedly connected to the right sidewall plate 14.

In the present embodiment, the elastic clamping hook 51 and the locating block 52 of the clamping assembly between the second passage plate 12 and the right sidewall plate 14 are arranged on the right wall plate 122 of the second passage plate 12. The clamping slot 61 and the slot 62 of the clamping assembly between the second passage plate 12 and the right sidewall plate 14 are arranged on the right sidewall plate 14. The elastic clamping hook 51 and the locating block 52 of the clamping assembly between the second passage plate 12 and the left sidewall plate 13 are arranged on the left wall plate 121 of the second passage plate 12. The clamping slot 61 and the slot 62 of the clamping assembly between the second passage plate 12 and the left sidewall plate 13 are arranged on the left sidewall plate 13. When the second passage plate 12 is close to the first passage plate 11 along the direction vertical to the plate surface of the first passage plate 11, the two locating blocks 52 on the second passage plate 12 are matched with the slots 62 on the left sidewall plate 13 and the right sidewall plate 14 in a plugging manner respectively. The two elastic clamping hooks 51 on the second passage plate 12 are matched with the clamping slots 61 on the left sidewall plate 13 and the right sidewall plate 14 in a clamping manner respectively so that the second passage plate 12 is fixedly connected with the left sidewall plate 13 and the right sidewall plate 14.

When the continuous paper is blocked in the conveying passage P, the elastic clamping hooks 51 are pulled to be detached from the clamping slots 61, and then the second passage plate 12 is moved along a direction away from the first passage plate 11 so that the locating blocks 52 are separated from the slots 62 so as to separate the second passage plate 12 from the first passage plate 11, thereby the blocked paper can be cleared conveniently.

The buffer plate 2 is located between the left sidewall plate 13 and the right sidewall plate 14 of the frame 1, arranged opposite to the fixed passage plate 4, and located upstream the second passage plate 12 along the conveying direction of the continuous paper. A length direction of the buffer plate 12 extends along the width direction of the conveying passage P. One side of the buffer plate 2 away from the second passage plate 12 is a contact part 24. Preferably, the contact part 24 is arranged in an arc shape, which can reduce a resistance on the continuous paper during conveyance.

The buffer plate 2 is movably connected with the frame 1, has the initial position and the final location, and is capable of moving between the initial position and the final location.

The buffer plate 2 is movably connected with the frame 1 through a guide mechanism. The guide mechanism includes insertion parts arranged at two ends of the length of the buffer plate 2 and guide slots arranged correspondingly on the frame 1. The insertion parts on the buffer plate 2 are matched with the guide slots on the frame 1 in a plugging manner, and are capable of moving along the guide slots so that the buffer plate 2 can move between the initial position and the final location relative to the frame 1.

In the present embodiment, the guide slots arranged on the frame 1 include two first guide slots 81 and two second guide slots 82, wherein the two first guide slots 81 are arranged on the left sidewall plate 13 and the right sidewall plate 14 symmetrically. The two second guide slots 82 are arranged on the left wall plate 121 and the right wall plate 122 of the second passage plate 12 symmetrically, wherein the second guide slots 82 are arranged close to the second passage plate 12. A length direction of the second guide slots 82 is parallel relative to a plate surface of the fixed passage plate 4, and there is a preset distance between a centerline of the width of the second guide slots 82 and the plate surface of the fixed passage plate 4. The second guide slots 82 are provided with a preset length and a preset width. The first guide slots 81 are located upstream the second guide slots 82 along the conveying direction of the continuous paper. A first end of the first guide slots 81 is at a preset distance from the fixed passage plate 4. A length direction of the first guide slots 81 extends gradually along a direction close to the second guide slots 82. The length direction of the first guide slots 81 and the length direction of the second guide slots 82 are arranged with an included angle. The first guide slots 81 are provided with a preset length and a preset width.

The insertion parts on the buffer plate 2 include first guide pillars 21 and second guide pillars 22 arranged symmetrically at two sides along a width direction of the continuous paper, wherein the first pillars 21 are located at an end of the buffer plate 2 away from the second passage plate 12 and the second guide pillars 22 are located at an end of the buffer plate 2 close to the second passage plate 12. Both the first guide pillars 21 and the second guide pillars 22 are arranged in a manner of protruding from a side face of the buffer plate 2. Both the first guide pillars 21 and the second guide pillars 22 are columnar, and may be also called as guide columns. The two first guide pillars 21 are matched with the first guide slots 81 on the left sidewall plate 13 and the right sidewall plate 14 in a plugging manner respectively, and are capable of moving along the length direction of the first guide slots 81, and the two second guide pillars 22 are matched with the second guide slots 82 at two sides of the second passage plate 12 in a plugging manner respectively and are capable of moving along the length direction of the second guide slots 82, so that the buffer plate 2 can move between the initial position and the final location relative to the frame 1.

As shown in FIG. 3a, when the buffer plate 2 is located at the initial position, the first guide pillars 21 on the buffer plate 2 are located at an end of the first guide slots 81 close to the first passage plate 11. The buffer plate 2 is opposite to the fixed passage plate 4 to form the paper input passage R. As shown in FIG. 3b, when the buffer plate 2 is located at the final location, the first guide pillars 21 on the buffer plate 2 are located at an end of the first guide slots 81 away from the first passage plate 11, and the buffer plate 2 is arranged with an included angle with the first passage plate 11. No matter the buffer plate 2 is located at the initial position, or the final location, or is located between the initial position and the final location, the second guide pillars 22 on the buffer plate 2 are always in the second guide slots 82 and are capable of moving along the length direction of the second guide slots 82. Since the second guide slots 82 are parallel with the first passage plate 11, thereby ensuring that a distance between an end of the buffer plate 2 close to the second passage plate 12 and the first passage plate 11 is unchanged and always communicate with the conveying passage P. A unique paper input passage R communicating with the conveying passage P is formed between an end of the buffer plate 2 away from the second passage plate 12 and the first passage plate 11. The paper input passage R is provided with a unique paper inlet.

Figure 5:
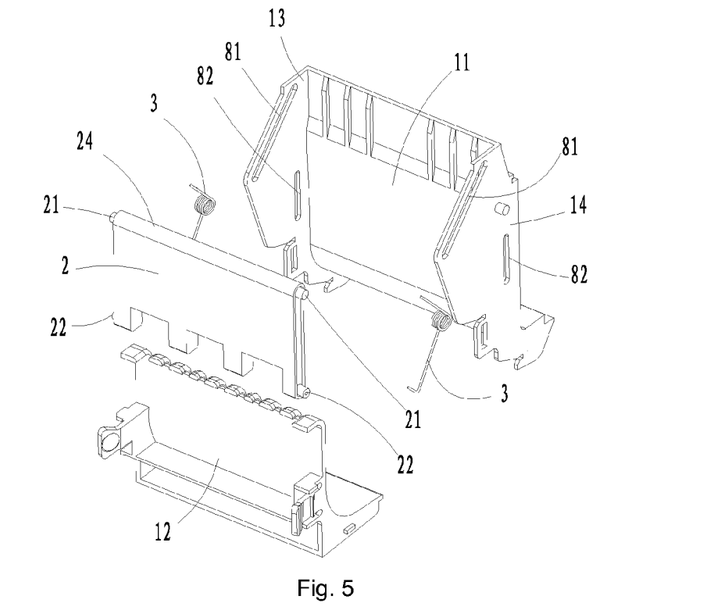
FIG. 5 is a exploded view of a paper input mechanism having a buffer function according to a second embodiment of the present invention.

It should be noted that the two guide slots 82 in the present embodiment are arranged on the left wall plate 121 and the right wall plate 122 of the second passage plate 12 respectively. As shown in FIG. 5, the two second guide slots 82 may be also arranged on the left sidewall plate 12 and the right sidewall plate 14 symmetrically in other embodiments provided by the present invention.

One end of the elastic resetting element 3 is connected with the frame 1 and another end is connected with the buffer plate 2. The buffer plate 2 always has a tendency to move towards the initial position under the action of the elastic force of the elastic resetting element 3. The elastic resetting element 3 may be in a structural form of a tension spring, a torsional spring, and a pressure spring and so on. In the present embodiment, the elastic resetting element 3 is a torsional spring and there are two elastic resetting element 3 located at outer sides of the left sidewall plate 13 and the right sidewall plate 14 of the frame 1 respectively, wherein an end of the elastic resetting element 3 located at an outer side of the left sidewall plate 13 is abutted against the first guide pillars 21 on the buffer plate 2 and another end is connected with the left sidewall plate 13, and an end of the elastic resetting element 3 located at an outer side of the right sidewall plate 14 is abutted against the first guide pillars 21 of the buffer plate 2, and another end is connected with the right sidewall plate 14. The first guide pillars 21 on the buffer plate 2 always have a tendency of moving along the first guide slots 81 towards a direction close to the first passage plate 11 under the action of elastic forces of the two elastic resetting elements 3 so that the buffer plate 2 always has a tendency of moving towards the initial position.

Preferably, the included angle between the first guide slots 81 and the first passage plate 11 is 45 degrees. In this way, a paper inputting direction of the continuous paper before passing through the buffer plate 2 is vertical to a paper discharging direction after passing through the buffer plate 2. The first guide slots 81 are located on an angular bisector of the paper inputting direction and the paper discharging direction of the continuous paper. At the moment, a pressure of the continuous paper on the buffer plate 2 is a resultant force of a tension force in the paper inputting direction and a tension force in the paper discharging direction. The resultant force is in the same direction as the length direction of the first guide slots 81, thus the first guide pillars 21 on the buffer plate 2 can move along the length direction of the first guide slots 81 smoothly.

Figure 6A:
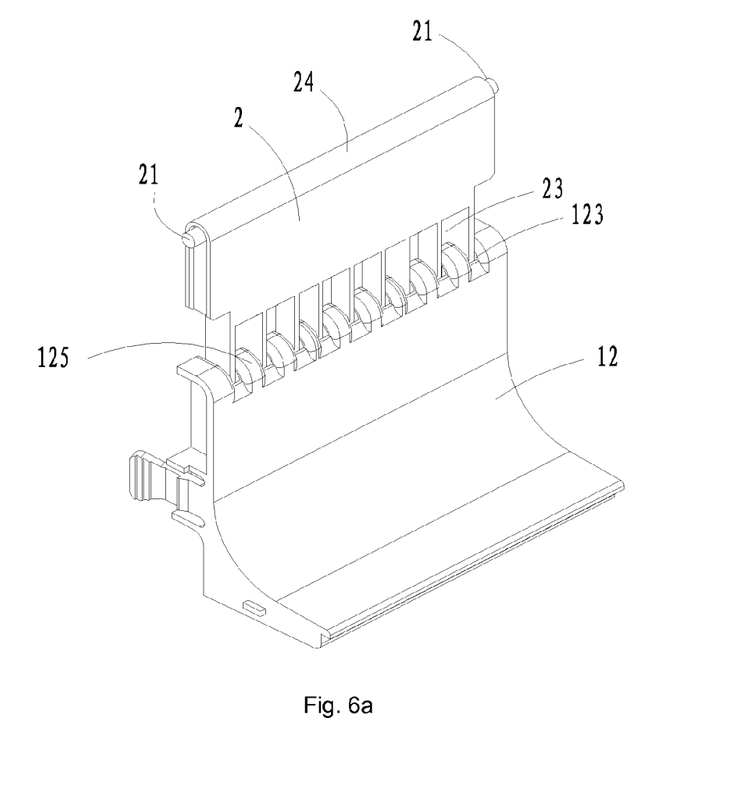
FIG. 6a is a schematic view of a partial structure of the paper input mechanism having a buffer function according to the first embodiment of the present invention, wherein the buffer plate is located at the initial position.
Figure 6B:
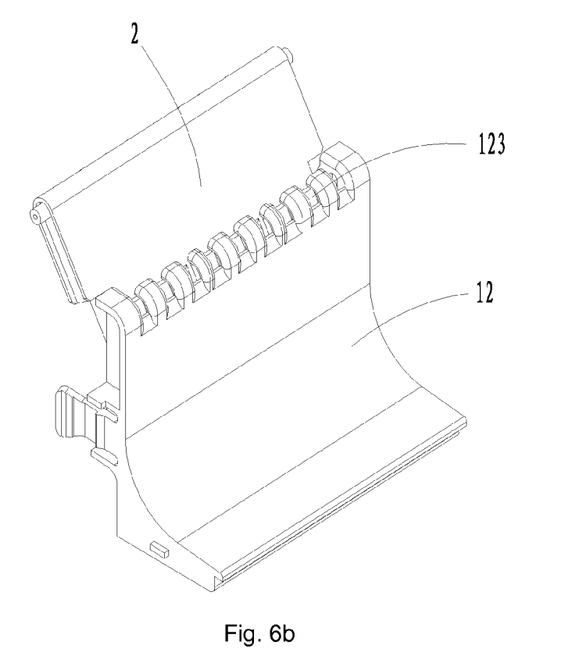
FIG. 6b is a schematic view of a partial structure of the paper input mechanism having a buffer function according to the first embodiment of the present invention, wherein the buffer plate deviates from the initial position.

Further, as shown in FIG. 6a and FIG. 6b, an end of the buffer plate 2 close to the second passage plate 12 is provided with a plurality of insertion plates 23. Each insertion plate 23 is provided with a set length and a set width. A paper inputting side of the second passage plate 12 is provided with an arc-shaped flanging 125 formed by a plurality of arc-shaped blocks. A slot 123 is formed between every two adjacent arc-shaped blocks. The size of each slot 123 is matched with the size of a corresponding insertion plate 23 on the buffer plate 2 and each slot 123 can be matched with the corresponding insertion plate 23 arranged on the buffer plate 2 in a plugging manner. When the buffer plate 2 is located at the initial position, the slots 123 on the second passage plate 12 are matched with the insertion plates 23 on the buffer plate 2 in a plugging manner. When the buffer plate 2 is pressed by the continuous paper to deviate from the initial position, the insertion plates 23 on the buffer plate 2 are separated from the slots 123 on the second passage plate 12. The buffer plate 2 is connected more closely with the second passage plate 12 by arranging the insertion plates 23 and the slots 123 between the buffer plate 2 and the second passage plate 12. The continuous paper can be guided to move smoothly by arranging the arc-shaped flanging 125.

A working process of a paper input mechanism having a buffer function according to the present invention will be introduced hereinafter.

As shown in FIG. 3a, in an initial state, the buffer plate 2 is located at an initial position under the action of the elastic force of the elastic resetting element 3. At the moment, the paper input mechanism is provided with a unique paper inlet. A user can only load continuous paper into the conveying passage P from the paper inlet when loading the paper and the continuous paper is discharged from a paper outlet of the conveying passage P. When the continuous paper presses the buffer plate 2, the buffer plate 2 deviates from the initial position to move from the initial position to the final location. At the moment, the contact part 24 of the buffer plate 2 tensions the continuous paper under the elastic force of the elastic resetting element 3.

A paper input mechanism having a buffer function according to the present invention includes a frame, a buffer plate, a fixed passage plate and at least one elastic resetting element, wherein a conveying passage P is arranged on the frame; the buffer plate and the fixed passage plate are located upstream the conveying passage P along a conveying direction of continuous paper; the buffer plate is movably connected with the frame, has a initial position, and is capable of being pressed by the continuous paper to deviate from the initial position, wherein the buffer plate is opposite to the fixed passage plate when being located at the initial position, so as to form a paper input passage; the paper input passage is provided with a unique paper inlet. Therefore, an operator can only load the continuous paper into the conveying passage P from the paper inlet when loading the continuous paper. When the continuous paper is static, the buffer plate is located at the initial position under the action of the elastic resetting element. When being pulled to move, the continuous paper presses the buffer plate to deviate from the initial position. In the meanwhile, the buffer plate can maintain the continuous paper in a tensioned state under the action of the elastic resetting element. Compared with the prior art, the paper input mechanism having a buffer function according to the present invention provides the buffer plate to not only realize a buffer function, but also form a unique paper inlet through close fit between the buffer plate and the frame, thereby effectively avoiding the problem that continuous paper is loaded incorrectly by a user, and improving the usability of the product.

Figure 7:
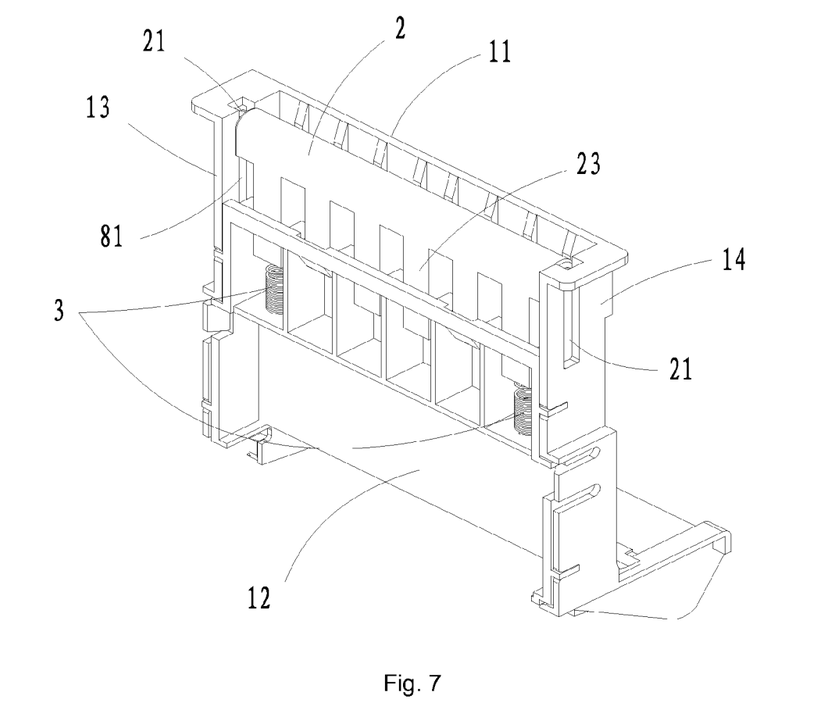
FIG. 7 is a structural view of a paper input mechanism having a buffer function according to a third embodiment of the present invention.
Figure 8A:
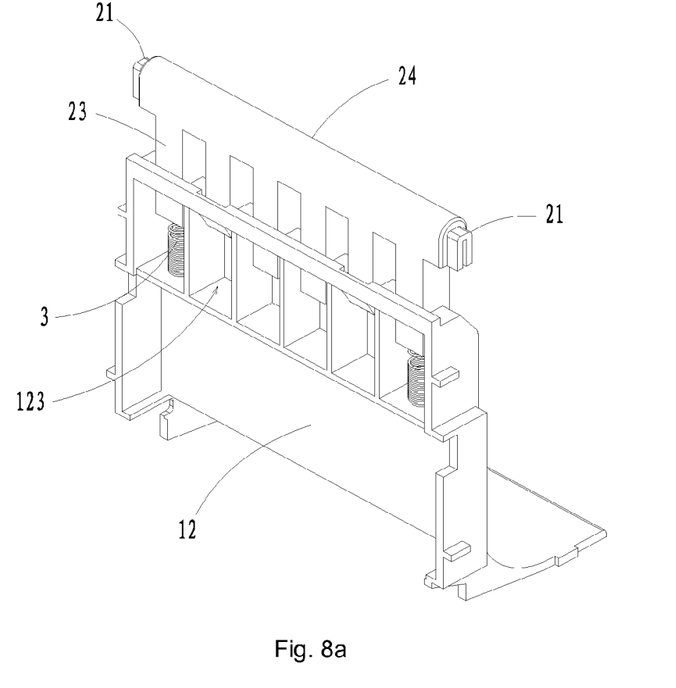
FIG. 8a is the first schematic view of a partial structure of the paper input mechanism having a buffer function according to the third embodiment of the present invention.
Figure 8B:
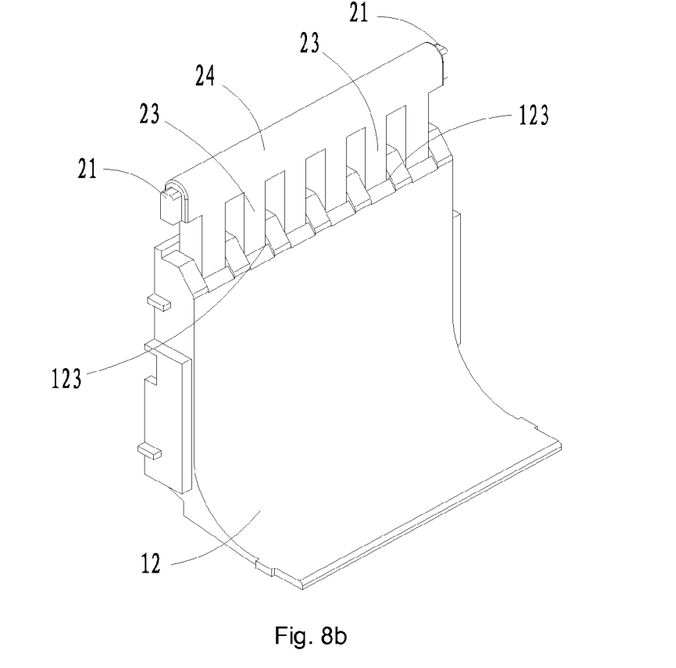
FIG. 8b is the second schematic view of the partial structure of the paper input mechanism having a buffer function according to the third embodiment of the present invention.

FIG. 7 is a structural view of a paper input mechanism having a buffer function according to a third embodiment of the present invention, FIG. 8a is the first schematic view of a partial structure of the paper input mechanism having a buffer function according to the third embodiment of the present invention, and FIG. 8b is the second schematic view of the partial structure of the paper input mechanism having a buffer function according to the third embodiment of the present invention. As shown in FIG. 7, FIG. 8a and FIG. 8b, compared with the foregoing embodiment, the paper input mechanism provided by the present embodiment is different in that, in the present embodiment, guide slots of a guide mechanism include two first guide slots 81 arranged on the frame 1; insertion parts of the guide mechanism include two first guide pillars 21 arranged at two sides of the buffer plate 2 along a width direction of the continuous paper, wherein the two first guide slots 81 are arranged on a left sidewall plate 13 and a right sidewall plate 14 symmetrically; a length direction of the first guide slots extends along a direction parallel with a plate surface of a first passage plate 11; the two first guide pillars 21 are located on an end of the buffer plate 2 away from a second passage plate 12; the first guide pillars 21 are shaped as cuboids, a width thereof is matched with a width of the first guide slots 81 and a length thereof is smaller than a length of the first guide slots 81.

The two guide pillars 21 on the buffer plate 2 are matched with the two first guide slots 81 on the frame 1 in a plugging manner respectively and are capable of moving along the length direction of the first guide slots 81, that is, the buffer plate 2 moves integrally along a direction in parallel with a plate surface of the fixed passage plate 4 and has an initial position and a final location, wherein the first guide pillars 21 on the buffer plate 2 are located at an end of the first guide slots 81 away from the second passage plate 12 when the buffer plate 2 is located at the initial position and a contact part 24 of the buffer plate 2 has the longest distance from the second passage plate 12. The first guide pillars 21 on the buffer plate 2 are located at an end of the first guide slots 81 close to the second passage plate 12 when the buffer plate 12 is located at the final location, and the contact part 24 of the buffer plate 2 has the shortest distance from the second passage plate 12. No matter the buffer plate 2 is located at the initial position, or the final location, or is located between the initial position and the final location, a unique paper input passage communicating with a conveying passage P is formed between the buffer plate 2 and the fixed passage plate 4. The paper input passage is provided with a unique paper inlet, thus an operator can only load the continuous paper into the conveying passage P through the paper inlet.

In the present embodiment, the elastic resetting element 3 is a pressure spring, and there are two pressure springs both located in slots 123 of the second passage plate 12, and arranged symmetrically about the centre of a width of the conveying passage P. One end of the two pressure springs respective is abutted against the second passage 12 and the other end of the two pressure springs respective is abutted against insertion plates 23 of the buffer plate 2. The first guide pillars 21 on the buffer plate 2 always have a tendency of moving along the first guide slots 81 towards a direction away from the second passage plate 12 under the elastic forces of the two pressure springs so that the buffer plate 2 always has a tendency of moving towards the initial position.

Figure 9A:
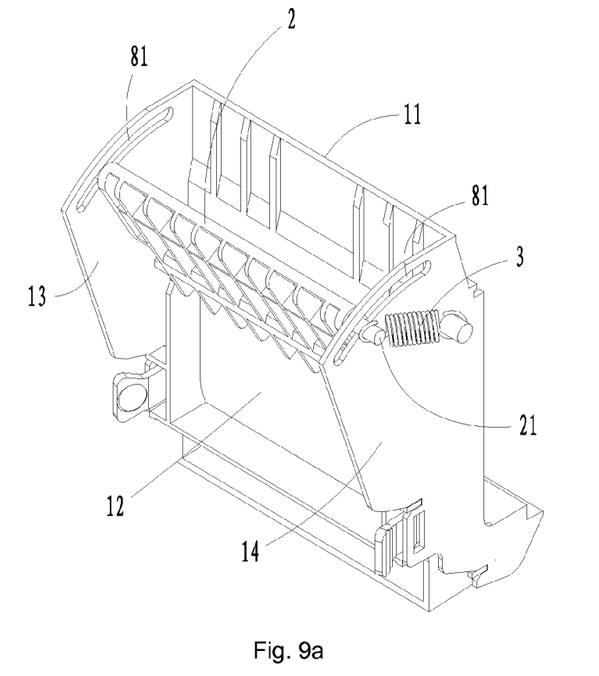
FIG. 9a is a structural view of a paper input mechanism having a buffer function according to a fourth embodiment of the present invention.
Figure 9B:
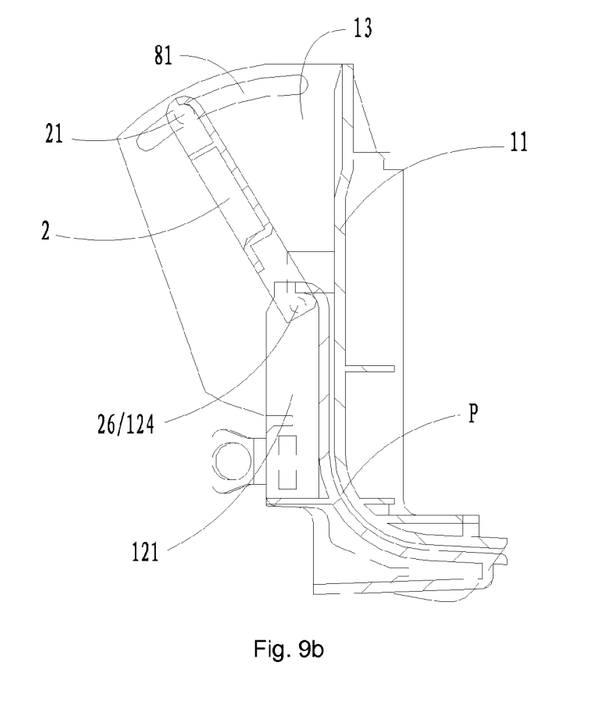
FIG. 9b is a structural section view of the paper input mechanism having a buffer function according to a fourth embodiment of the present invention.

FIG. 9a is a structural view of a paper input mechanism having a buffer function according to a fourth embodiment of the present invention and FIG. 9b is a structural section view of the paper input mechanism having a buffer function according to the fourth embodiment of the present invention. As shown in FIG. 9a and FIG. 9b, compared with the first embodiment, the present embodiment is different in that one end of the buffer plate 2 is pivoted with the frame 1 and another end is movably connected with the frame 1 via a guide mechanism, and the buffer plate 2 can rotate relative to the frame 1 and has an initial position and a final location in the present embodiment.

Specifically, an end of the buffer plate 2 close to a second passage plate 12 is provided with a pivoting shaft 26. Pivoting holes 124 are arranged on a left wall plate 121 and a right wall plate 122 of the second passage 12. The pivoting holes 124 are at a set distance from a plate surface of a first passage plate 11. The buffer plate 2 is pivoted with the pivoting holes 124 through the pivoting shaft 26 and is capable of rotating around the centres of the pivoting holes 124.

Guiding slots of the guide mechanism in the present embodiment include two first guide slots 81 arranged symmetrically on the left sidewall plate 13 and the right sidewall plate 14. The two first guide slots 81 are arc slots taking the pivoting holes 124 as centres. Insertion parts of the guide mechanism include two first guide pillars 21 arranged symmetrically on two ends of a length direction of the buffer plate 2. The first guide pillars 21 are columnar, and the external diameters of the first guide pillars 21 are matched with the widths of the first guide slots 81.

The two first guide pillars 21 are matched with the two first guide slots 81 on the frame 1 in a plugging manner respectively and are capable of moving along a length direction of the first guide slots 81, that is, the first guide pillars 21 move along the length direction of the first guide slots 81 when the buffer plate 2 rotates around the axis of the pivoting holes 124. Limited by the length of the first guide slots 81, the buffer plate 2 has an initial position and a final location, wherein the first guide pillars 21 on the buffer plate 2 are located at an end of the first guide slots 81 close to a fixed passage plate 4 when the buffer plate 2 is located at the initial position and a contact part 24 of the buffer plate 2 has the shortest distance with the fixed passage plate 4; the first guide pillars 21 on the buffer plate 2 are located at an end of the first guide slots 81 away from the fixed passage plate 4 when the buffer plate 2 is located at the final location, the contact part 24 of the buffer plate 2 has the longest distance with the fixed passage plate 4, and the buffer plate 2 is arranged with an included angle with the fixed passage plate 4 at the moment Wherein no matter the buffer plate 2 is located at the initial position, or the final location, or is located between the initial position and the final location, a unique paper input passage communicating with a conveying passage P is formed between the buffer plate 2 and the fixed passage plate 4. The paper input passage is provided with a unique paper inlet and an operator can only load the continuous paper into the conveying passage P through the paper inlet.

In the present embodiment, the elastic resetting element 3 is a tension spring, and there are two tension springs located at outer sides of the left sidewall plate 13 and the right sidewall plate 14 respectively, wherein an end of the tension spring located at an outer side of the left sidewall plate 13 is connected with the first guide pillars 21 on the buffer plate 2 and the other end is connected with the left sidewall plate 13, and an end of the tension spring located at an outer side of the right sidewall plate 14 is connected with the first guide pillars 21 of the buffer plate 2, and the other end is connected with the right sidewall plate 14. The first guide pillars 21 on the buffer plate 2 always have a tendency of moving along the first guide slots 81 towards a direction close to the fixed passage plate 4 under elastic forces of the two tension springs so that the buffer plate 2 always has a tendency of rotating from the centres of the pivoting holes 124 towards the initial position.

Figure 10:
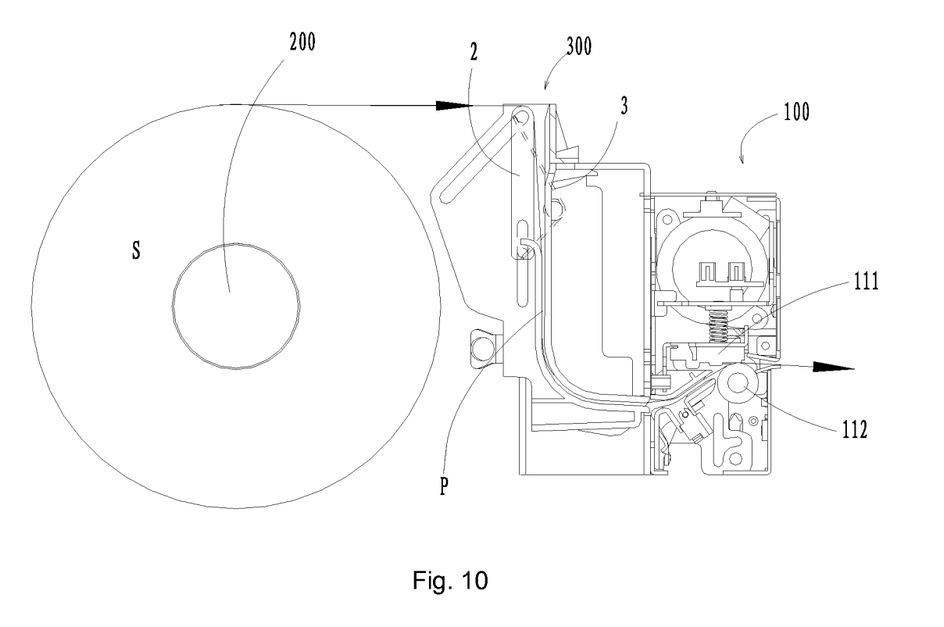
FIG. 10 is a structural cross-section view of a printing device provided with a paper input mechanism having a buffer function according to an embodiment of the present invention.

FIG. 10 is a structural section view of a printing device provided with a paper input mechanism having a buffer function according to an embodiment of the present invention. As shown in FIG. 10, the printing device provided in the present embodiment includes a printing mechanism 100, a paper roll supporting mechanism 200 and a paper input mechanism 300.

The printing mechanism 100 includes a printing head 111 and a platen 112 matched in tangency with each other. Continuous paper passes between the printing head 11 and the platen 112, wherein the platen 112 is configured to support and drive the continuous paper to move downstream, and the printing head 111 is configured to print preset printing content on the continuous paper. The paper roll supporting mechanism 200 is arranged upstream the printing mechanism 100 along a conveying direction of the continuous paper and is configured to support a paper roll S for printing. The paper roll supporting mechanism 200 may be a supporting bracket or a supporting shaft. The paper roll supporting mechanism 200 is a supporting shaft in the present embodiment.

The paper input mechanism 300 is located between the printing mechanism 100 and the paper roll supporting mechanism 200. A paper outlet of the paper input mechanism 300 communicates with a paper inlet of the printing mechanism 100. The continuous paper is draw from the paper roll supported by the paper roll supporting mechanism 200 and can be conveyed to a location between the printing head 111 and the platen 112 after passing through a conveying passage P of the paper input mechanism 300. A specific embodiment of the paper input mechanism 300 is the same as the foregoing embodiments and will not be described repeatedly here.

A working process of a printing device provided with a paper input mechanism having a buffer function according to the present invention will be introduced below.

In an initial state, a buffer plate 2 of the paper input mechanism 300 is located at an initial position. The paper input mechanism 300 is provided with a unique paper inlet. A paper outlet of a conveying passage P of the paper input mechanism 300 communicates with the paper inlet of the printing mechanism 100. Continuous paper is draw from the paper roll supported by the paper roll supporting mechanism 200 and can only enter the conveying passage P of the paper input mechanism 300 from the paper inlet of the paper input mechanism 300. The continuous paper then enters the location between the printing head 111 and the platen 112 of the printing mechanism 100. The platen 112 rotates to convey the continuous paper downstream and the printing head 111 prints on the continuous paper. At the moment, the continuous paper presses the buffer plate 2 so that the buffer plate 2 deviates from the initial position. The buffer plate 2 tensions the continuous paper under the action of an elastic resetting element 3.

The printing device in the present embodiment is provided with a unique paper inlet during a paper loading process, thus preventing the continuous paper from being installed incorrectly and improving the usability of the of the printing device.

The above description is only for preferred embodiments of the present invention and not used for limiting the invention. For those skilled in the art, the present invention may have various modifications and changes. Any modifications, equivalent replacements and improvements and so on made within the spirit and principle of the present invention should be included within the protection scope of the present invention.

The invention claimed is:

1. A paper input mechanism having a buffer function, comprising a frame forming a conveying passage (P) for conveying continuous paper, and further comprising a fixed passage plate and a buffer plate both located at a paper inputting side of the conveying passage (P),
   wherein the buffer plate has an initial position and is pressed by the continuous paper to deviate from the initial position;
   wherein the buffer plate is opposite to the fixed passage plate when being located at the initial position, so as to form a paper input passage (R) and the paper input passage (R) is connected with the conveying passage (P),
   wherein the buffer plate is moveably connected with the frame,
   wherein the frame is provided with an elastic resetting element enabling the butter plate to reset to the initial position,
   wherein pairs of first and second guide pillars are respectively provided at two sides of the buffer plate along a conveying direction of the continuous paper,
   wherein the frame is provided with a first guide slot matched with the first guide pillar and a second guide slot matched with the second guide pillar, and
   wherein, during a process in which the buffer plate deviates from the initial position, the first guide pillar slides from a start end of the first guide slot to a stop end of the first guide slot and the second guide pillar slides from a start end of the second guide slot to a stop end of the second guide slot.

2. The paper input mechanism having a buffer function according to claim 1, wherein the frame comprises a first passage member and a second passage member to form the conveying passage (P), wherein the fixed passage plate is integrated with the first passage member.

3. The paper input mechanism having a buffer function according to claim 2, wherein the first passage member comprises a first passage plate and sidewall plates arranged at two sides of the first passage plate along a width direction of the conveying passage (P); the second passage member comprises a second passage plate and wall plates arranged at two sides of the second passage plate along the width direction of the conveying passage (P), wherein a clamping mechanism is provided between the sidewall plates and the wall plates, and there is a preset distance between the first passage plate and the second passage plate to form the conveying passage (P).

4. The paper input mechanism having a buffer function according to claim 3, wherein the clamping mechanism comprises an elastic clamping hook and a clamping slot, wherein, the elastic clamping hook is arranged on one of the sidewall plates and the wall plates, and the clamping slot is arranged on the other one of the sidewall plates and the wall plates and matched with the elastic clamping hook in a clamping manner.

5. The paper input mechanism having a buffer function according to claim 1, wherein a section of the conveying passage (P) along a conveying direction of the continuous paper is in an L shape, or a section of a combination of the conveying passage (P) and the paper input passage (R) along the conveying direction of the continuous paper is in an L shape.

6. The paper input mechanism having a buffer function according to claim 1, wherein a length direction of the first guide slot is arranged with an included angle with a length direction of the second guide slot.

7. The paper input mechanism having a buffer function according to claim 6,
wherein a length direction of the second guide slot is parallel with the fixed passage plate, and
wherein the first guide slot is located upstream the second guide slot along a conveying direction of the continuous paper.

8. The paper input mechanism having a buffer function according to claim 1, wherein a length direction of the second guide slot is parallel with the fixed passage plate; the first guide slot is located upstream the second guide slot along a conveying direction of the continuous paper.

9. The paper input mechanism having a buffer function according to claim 1, wherein the buffer plate is pivoted with the frame through a pivoting shaft; the buffer plate is pressed by the continuous paper to rotate around the pivoting shaft so as to deviate from the initial position.

10. The paper input mechanism having a buffer function according to claim 1, wherein the buffer plate is arranged on the frame in a rectilinear translation-capable manner, and the frame is provided with a first guide slot guiding the buffer plate to perform rectilinear translation.

11. The paper input mechanism having a buffer function according to claim 1, wherein the frame comprises a first passage member and a second passage member to form the conveying passage (P), wherein the buffer plate is inserted in the second passage member, and which makes the buffer plate connected with the second passage member.

12. The paper input mechanism having a buffer function according to claim 11,
wherein the first passage member comprises a first passage plate and sidewall plates arranged at two sides of the first passage plate along a width direction of the conveying passage,
wherein the second passage member comprises a second passage plate and wall plates arranged at two sides of the second passage plate along the width direction of the conveying passage,
wherein a clamping mechanism is provided between the sidewall plates and the wall plates, and the first passage plate and the second passage plate are separated by a preset distance to form the conveying passage.

13. A printing device, comprising:
a roll supporting mechanism;
a printing mechanism;
a paper input mechanism arranged between the roll supporting mechanism and the printing mechanism,
wherein a conveying passage of the paper input mechanism communicates with a paper inlet of the printing mechanism, and wherein the paper input mechanism includes a buffer function comprising a frame forming a conveying passage for conveying continuous paper, and a fixed passage plate and a buffer plate both located at a paper inputting side of the conveying passage,
wherein the buffer plate has an initial position and is pressed by the continuous paper to deviate from the initial position,
wherein the buffer plate is opposite to the fixed passage plate when being located at the initial position so as to form a paper input passage connected with the conveying passage,
wherein the buffer plate is moveably connected with the frame,
wherein the frame is provided with an elastic resetting element enabling the butter plate to reset to the initial position,
wherein pairs of first and second guide pillars are respectively provided at two sides of the buffer plate along a conveying direction of the continuous paper,
wherein the frame is provided with a first guide slot matched with the first guide pillar and a second guide slot matched with the second guide pillar, and
wherein, during a process in which the buffer plate deviates from the initial position, the first guide pillar slides from a start end of the first guide slot to a stop end of the first guide slot and the second guide pillar slides from a start end of the second guide slot to a stop end of the second guide slot.

* * * * *